TWO CONDITION FAILURE MONITORING SYSTEM

Filed Aug. 3, 1966

INVENTORS
Elmer W. Madsen
Albert C. Leenhouts
BY
Johnson and Kline
ATTORNEYS

United States Patent Office 3,491,302
Patented Jan. 20, 1970

3,491,302

TWO CONDITION FAILURE MONITORING SYSTEM

Elmer W. Madsen, Bristol, and Albert C. Leenhouts, Granby, Conn., assignors to The Superior Electric Company, Bristol, Conn., a corporation of Connecticut Filed Aug. 3, 1966, Ser. No. 570,083
Int. Cl. H03k *19/20*
U.S. Cl. 328—92 8 Claims

ABSTRACT OF THE DISCLOSURE

A system for producing a signal indicating the failure of any one of a plurality of two-condition means not being at either one of its two conditions by sensing both conditions and preventing the occurrence of the signal if either one of the two conditions occurs. The system has either an AND gate or a NOR gate for each two-condition means with each condition being connected to an input so that the gate will produce a malfunctioning signal if neither input monitors the existence of a condition.

The present invention relates to a system for monitoring the absence of a condition of a two-condition electrical device, and more particularly to a system for providing a signal if the device malfunctions by not being at either one of its two conditions.

One type of electrical device to which the present system has specific application is an electrical switch of the kind that has a contact arm and two separate contacts. The arm is normally in electrical engagement with one contact and is actuatable to become disengaged from the one contact and become engaged with the other contact. Except for the short duration required to move from one contact to the other, the switch to be functioning properly must be in engagement with either one of the contacts. If the switch is not functioning properly, an error signal is provided by the hereinafter disclosed system.

While reference is made to a switch, the system has especial utility when employed with a tape reader that reads a perforated tape. One well-known reader includes a plurality of switches that are spaced transversely of the longitudinal movement of the tape and at each reading each switch produces an electrical signal of the tape at its position. If the part of the tape being read by a switch is perforated, a signal is provided on one lead while if the tape is not perforated, a signal appears on another lead. So long as a signal appears on either lead, the switch may be assumed to be functioning properly but if a signal does not appear, an error is introduced into the reading of the tape. This error will not only affect the one reading in mechanisms controlled by the reader but may also affect all subsequent readings.

It is accordingly an object of the present invention to provide a system for producing an error signal if any one of a plurality of two-condition electrical devices fails to achieve one or the other of its conditions.

Another object of the present invention is to provide a system that achieves the above object but yet which may be easily interconnected with the devices and not interfere with the operation thereof.

A further object of the present invention is to provide a system that produces an error signal when a two-condition device fails to achieve either one of the conditions that is extremely simple in construction, economical, durable and reliable in use.

The present invention is herein disclosed as it would be applied to a plurality of independently operable switches such as is found in well-known types of preforated tape readers. The tape is perforated in transverse rows according to a code and the switches are caused to react to each row. When the row is positioned to actuate the switches, if a hole is present at a switch, the switch assumes one condition and if the part of the tape at a switch is not perforated, then the switch assumes its other condition. Each switch includes a switch arm and two separate contacts with the switch arm in one condition engaging one contact and in the other condition engaging the other contact. The condition of the switch, represented by the position of the switch arm, is transferred into an electrical signal by providing a voltage to the switch arm. A lead is connected to each contact and the voltage appears on the lead whose contact is engaged by the shiftable element. The voltage is supplied sufficiently long after the tape has been positioned to actuate the switches to assure that each switch arm has assumed one or the other of its conditions.

In accordance with the present invention, there is provided a logic circuit which is interconnected with the switchs to provide a signal if any one of the switches does not have its switch arm in engagement with a contact when the voltage is applied to the arm. Specifically, in one embodiment, where the voltage is positive, an initial NOR gate is provided for each switch with the gate having two inputs, one connected to one contact and the other to the other contact. If either contact receives the voltage, a zero signal appears at its output. The output of each of the initial NOR gates is connected to an input of another final NOR gate, the latter having a separate input for each initial NOR gate. If all of the initial NOR gates provide the same zero signal to the input of the final NOR gate, then the output thereof will have a positive signal which indicates that each of the switches has assumed one or the other of its conditions. If any one of the initial NOR gates does not have a zero signal, the output of the final NOR gate will not be positive but logically would be zero and constitute an error signal indicating that one of the switches has not achieved one or the other of its conditions.

Another embodiment of the invention consists of a system which is used where the voltage is substantially zero and where it is desired to have the error signal of the system be positive. In such embodiment, an AND gate is provided for each of the switches with each AND gate having one input connected to one contact of a switch and another input connected to the other contact of the switch. The outputs of the AND gates are each connected to an input of an OR gate with the error signal appearing at the output of the OR gate providing the error signal. If all switches are at one or the other of their two conditions when a zero voltage is applied to the switch arms, then the output of each AND gate will be zero and hence the output of the OR gate will be zero. If on the other hand a switch malfunctions such that both inputs to the AND gate are positive, a positive signal appears at the output of its AND gate which when transferred to the OR gate appears as a positive signal and as such is indicative of the malfunctioning of a switch.

The output of the system in either embodiment may be employed, depending upon the circuit to which they are appended, to either halt process of the information or to require the tape reader to read the information again until it is properly read or to perform any other desired function such as a signal.

Other features and advantages will hereinafter appear.

Figures 1, 2, 3, 4:
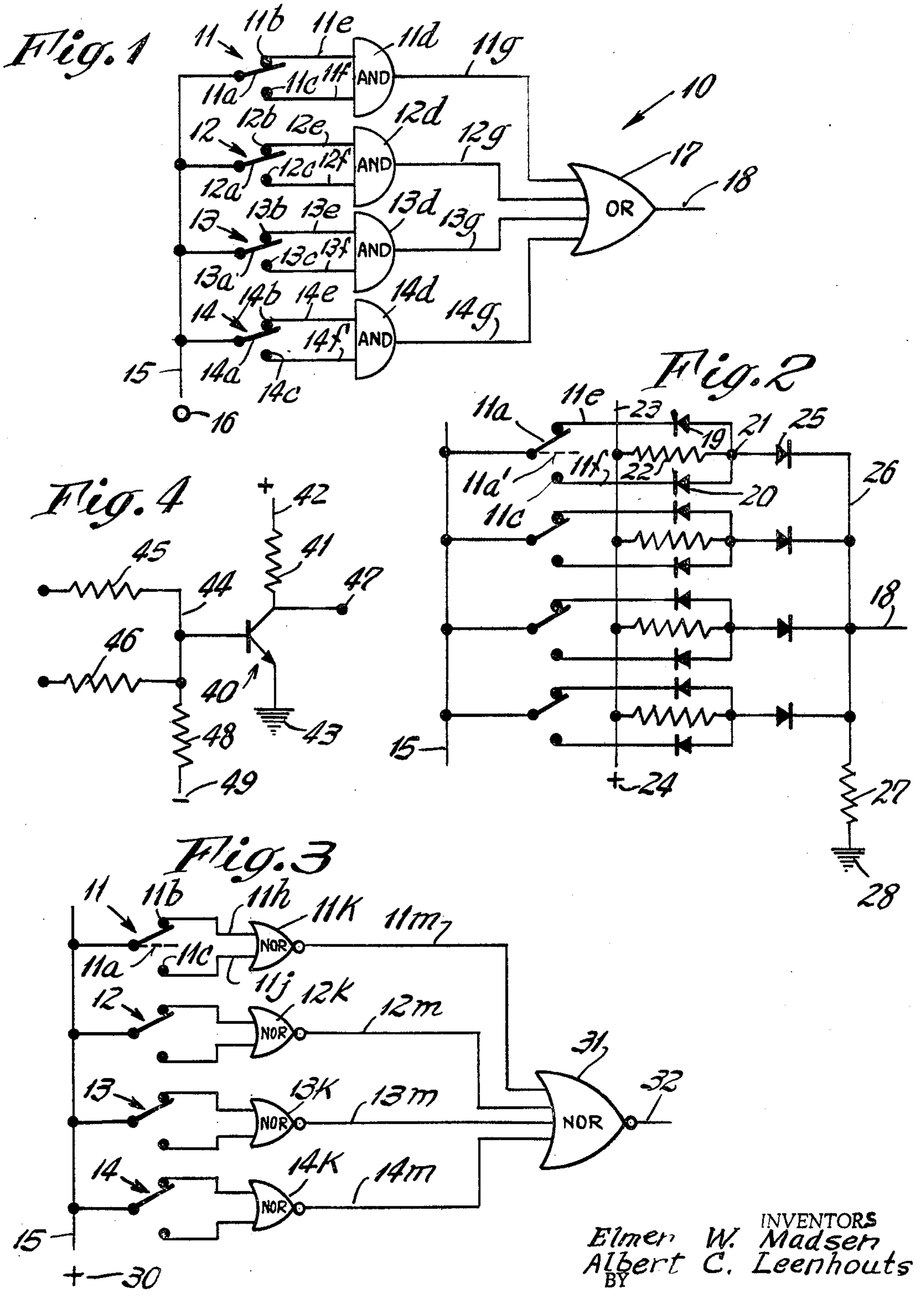
FIGURE 1 is a schematic and logic diagram of the embodiment of the monitoring system of the present invention in which a zero voltage is applied to the switches.
FIG. 2 is a schematic diagram thereof.
FIG. 3 is a schematic and logic diagram of the embodiment of the system wherein a positive voltage is applied to the switches.
FIG. 4 is a schematic diagram of one of the NOR gates of the embodiment shown in FIG. 3.

Referring to the drawing, the embodiment of the invention shown in FIGS. 1 and 2 is indicated by the reference numeral 10 and is shown connected to a plurality of switches 11, 12, 13, 14, etc. Each switch has a switch arm 11*a*, 12*a*, 13*a*, 14*a* respectively that is movable between a first contact 11*b* and a second contact 11*c* for the switch 11, contacts 12*b* and 12*c* for the switch 12, contacts 13*b* and 13*c* for the switch 13, etc. As has been herein set forth, each switch in order to be functioning properly is required to have its switch arm in engagement with either one of its contacts in order to achieve one of the two conditions except for the short duration when the switch arm is moved from one contact to another. Failure of the arm to engage one of the contacts constitutes one type of malfunctioning thereof and the system of the present invention will sense and produce a signal indicative of the malfunction. The switch arms of the switches are each connected in parallel to a lead 15 on which a zero voltage indicated by the reference numeral 16 is applied at all times.

The system 10 includes an AND gate connectible to each of the switches with each AND gate having the same number as its associated switch. Thus the AND gate 11*d* has one input 11*e* connected to the contact 11*b* and another input 11*f* connected to the contact 11*c*. Similarly the AND gates 12*d*, 13*d* and 14*d* each have inputs 12*e* and 12*f*, 13*e* and 13*f* and 14*e* and 14*f* connected to the respective contacts of the switches with which they are associated. Each AND gate further has an output lead 11*g*, 12*g*, 13*g* and 14*g* respectively. The output leads of the AND gates constitute separate inputs to an OR gate 17 that has an output 18 on which the error signal of the system appears.

As the zero voltage 16 is applied at all times, the output voltage of the OR gate 17 is monitored after the switches have been actuated and assumed to have achieved one or the other of their two conditions. If each switch has assumed one or the other of its conditions then each AND gate wil have the same zero voltage at its output and thus all inputs to the OR gate 17 will have the same zero voltage value. In such an instance, the output 18 will have a substantially zero potential. If on the other hand any one, some, or all of the switches does not assume one of its two conditions, then both inputs to the AND gate of a malfunctioning switch will effectively become positive, producing a positive signal on the output lead of the AND gate. The positive signal will cause the OR gate 17 to produce a high positive voltage at the output 18 which is indicative of malfunctioning and may be subsequently utilized.

Referring to FIG. 2 which is a schematic diagram of the system shown in FIG. 1 each of the elements heretofore referred to are indicated by the same reference character. Each AND gate, referring specifically to the gate 11*d*, has a pair of diodes 19 and 20, each of which is connected to an input lead 11*e* and 11*f* respectively. The anodes of the diodes are connected to a common junction 21 as is one end of a resistor 22 with the other end of the resistor being connected to a lead 23 that is connected to a positive source of voltage 24. The common junction 21 is the output of the AND gate and is connected through a diode 25 to a lead 26 that is also connected through a resistor 27 to a ground 28.

It will be understood that each of the AND gates is similar in construction to the gate 11*d* and that all of the resistors corresponding to the resistor 22 are connected in parallel to the positive source 24. Additionally, each AND gate output is connected through a diode (such as diode 25) with the cathode of the diodes being connected in parallel to the lead 26. The diode 25 and the corresponding diode in each AND gate are connected in parallel to the lead 18 and together with the resistor 27 form the OR gate 17.

With the above construction it will be understood that with a zero voltage 16 applied to the lead 15 and when all the switches are in one or the other of their two conditions, the common junction 21 will have a substantially zero potential. The diode 25 blocks the passage of the zero potential and hence the lead 26 is maintained at a zero potential. If, on the other hand, the switch arm 11*a*, for example, assumes the dotted line position 11*a'* wherein it is not in engagement with either contact 11*b* or contact 11*c*, then the common junction 21 approaches a positive potential having a value determined by the resistance 22 and the voltage of the source 24. The positive potential will pass through the diode 25 and cause the lead 26 to become positive indicating that a switch is not in one or the other of its two conditions. The existence of a positive potential on the lead 18 thus constitutes an error signal for the system.

It will be appreciated that if the switch arm has mechanically assumed one of its conditions but that a high contact resistance exists between the switch arm and the contact, that the switch has not in accordance with the present system assumed one of its two conditions. In such a situation, the common junction 21 will also become positive and hence an error signal will appear on the lead 18. Moreover, while reference has been made to one switch malfunctioning, the system will provide an error signal if more than one or all malfunction.

In the embodiment of the monitoring system shown in FIGS. 3 and 4, the switches 11 through 14 are identical and have their switch arms connected in parallel to the lead 15. In this embodiment, a positive voltage 30 is applied to the lead 15 and the error signal consists of a zero or low positive potential at the output of the system. Referring to the switch 11 the contacts 11*b* and 11*c* are each connected to an input 11*h* and 11*j* of a NOR gate 11*k* with the latter having an output 11*m*. Similarly each of the other switches 12–14 has its contacts connected to inputs of NOR gates 12*k*, 13*k*, 14*k*, with each of the NOR gates having an output lead 12*m*, 13*m* and 14*m* respectively. The output of each of the NOR gates is connected to a separate input of another NOR gate 31 having an output 32 on which the error signal of the system appears.

Shown in FIG. 4 is a schematic diagram of a NOR gate which may be employed for any of the NOR gates shown in the logic system of FIG. 3. Each NOR gate includes a transistor 40 having a collector connected through a resistance 41 to a positive source of voltage 42 while its emitter is connected to a ground 43. The base of the transistor is connected to a lead 44 to which ends of resistances 45 and 46 are connected. The other ends of the resistances constitute the inputs to the NOR gate and, for example, with the NOR gate 11*k*, these would have the leads 11*h* and 11*j* connected thereto. The output of the NOR gate appears at a terminal 47 which would, in the case of NOR gate 11*k*, be the output lead 11*m*. For the NOR gate 31 there would be connected in parallel to the lead 44, additional resistances similar to the resistances 45 and 46, with there being one resistance for each input to the NOR gate. The lead 44 is connected through a resistance 48 to a negative source of voltage 49.

In the operation of the system shown in FIG. 3, when a positive voltage 30 is applied to the lead 15, if a switch, such as switch 11, is in mechanical and electrical engagement with one or the other of its contacts, then the positive voltage will render the lead 44 positive, causing conduction of the transistor 40 and the output 47 (output 11*m*) will be essentially zero. If, on the other hand, the switch 11 assumes the position 11*a'* wherein it does not engage either one of its contact or if its contact resistance is high and is thereby malfunctioning, then the base of transistor 40 will become negative from the source 49, causing the transistor 40 to cease conduction and a positive voltage of the output 47 (output 11*m*). Each switch and its associated NOR gate functions independently of the other and each will produce its own output signal.

With the outputs 11*m* through 14*m* all being zero then the NOR gate 31 will maintain its transistor nonconducting and the output lead 32 (corresponding to the output 47) will be positive indicating that the switches are functioning properly. If on the other hand any one of the leads 11*m* through 14*m* or some, or all have a positive voltage thereon then the transistor of the NOR gate 31 will be caused to be conducting by the base of transistor 40 being relatively positive and the output lead 32 of the system will be less positive or ground indicating that there is a malfunctioning in the system.

While mechanical type switches have been heretofore disclosed it will be understood that the present invention may also be used with other two condition electrical devices, such as a photocell. Moreover, while reference has been made to a perforated tape reader, it will be understood that the heretofore system may be employed with other and different mechanisms having a plurality of two condition electrical elements and that any number of switches may be monitored.

As used herein a switch is considered to be at one or the other of its conditions when a voltage applied to its switch arm appears at one or the other of its contacts with a determined value. If the value is less than that selected, then the switch is considered to malfunction. Thus malfunction may be caused by the switch not mechanically engaging a contact or by a high ohmic resistance between the switch arm and the contact even if engaged. In each occurrence, the switch will fail to provide an output signal representative of its condition and hence the switch is considered to be malfunctioning.

While there has been disclosed two embodiments of the present invention, one for use with a zero voltage and the other for use with a positive voltage with the error signal consisting of a change in potential, it will be appreciated that if a different signal and/or a different voltage is employed that NAND gates may be utilized in the system.

It will accordingly be appreciated that there has been disclosed a system for monitoring the malfunctioning of any one of a plurality of two condition electrical devices. If each device fails to achieve one or the other of its two conditions the system provides an error signal which may be utilized in subsequent mechanisms to prevent an operation, repeat the same operation or perform other and different acts.

Variations and modifications may be made within the scope of the claims and portions of the improvements may be used without others.

We claim:

1. A two condition monitoring failure system connectible to a plurality of two condition devices with each device capable of assuming a first condition or a second condition with the system providing an error signal if any one of the devices malfunctions by failure to electrically indicate neither of its two conditions comprising a plurality of devices, each of said devices having a shiftable element, a first condition means and a second condition means with the element being shiftable to electrically engage either one of said condition means; a plurality of gate means, each of said gate means having an output, a first input and a second input and being adapted to provide an error signal on its output if said device malfunctions by failure to produce one of its two conditions; each of said devices being associated with one gate means, means connecting each gate means to its device with the first input being connected to the first condition means and the second input to the second condition means; second gate means having an output and a plurality of inputs, said second gate means being adapted to provide a system output error signal at its output whenever any one of its inputs has an error signal, means connecting an output of each gate means to an input of the second gate means; and means upon separately applying a voltage to each device for sensing if a system output error signal appears at the output of the second gate means.

2. The invention as defined in claim 1 in which the voltage applied to each device has a determined value, and the system output error signal is of a substantially different value.

3. The invention as defined in claim 1 in which the voltage applied to each device has a determined value, the signal at the output of the gate means is of substantially a value no higher than the determined value if the device is functioning and the signal at the output of the gate means is of substantially a value no less than the determined value if the device is malfunctioning.

4. The invention as defined in claim 1 in which the voltage applied to the devices is positive, and the output of the second gate means is a signal of a positive polarity of similar value when the device functions and is a signal of substantially less positive polarity when at least one of the devices malfunctions.

5. The invention as defined in claim 4 in which each gate means is a NOR gate and the second gate means is a NOR gate.

6. The invention as defined in claim 1 in which the voltage applied to the devices has a zero potential and the output of the second gate means is a signal of zero potential when the device functions and is of a positive potential when at least one of the devices malfunctions.

7. The invention as defined in claim 6 in which each gate means is an AND gate and the second gate means is an OR gate.

8. The invention as defined in claim 1 in which each device is an electrical switch, the shiftable element is a contact arm, the first condition means is a first contact, the second condition means is a second contact, and the voltage is applied to the contact arm, said switch functioning by said contact arm transferring said voltage without substantial diminution to either said first contact or said second contact and malfunctioning by failing to effect a voltage of similar value to either of said contacts.

References Cited

UNITED STATES PATENTS

| | | | |
|---|---|---|---|
| 3,296,460 | 1/1967 | Nelson | 307—203 |
| 3,311,753 | 3/1967 | Nelson | 307—215 |

DONALD D. FORRER, Primary Examiner

U.S. Cl. X.R.

307—203, 207, 215, 218, 231